No. 838,366. PATENTED DEC. 11, 1906.
G. WEIDINGER.
PLANTER ATTACHMENT.
APPLICATION FILED AUG. 9, 1906.
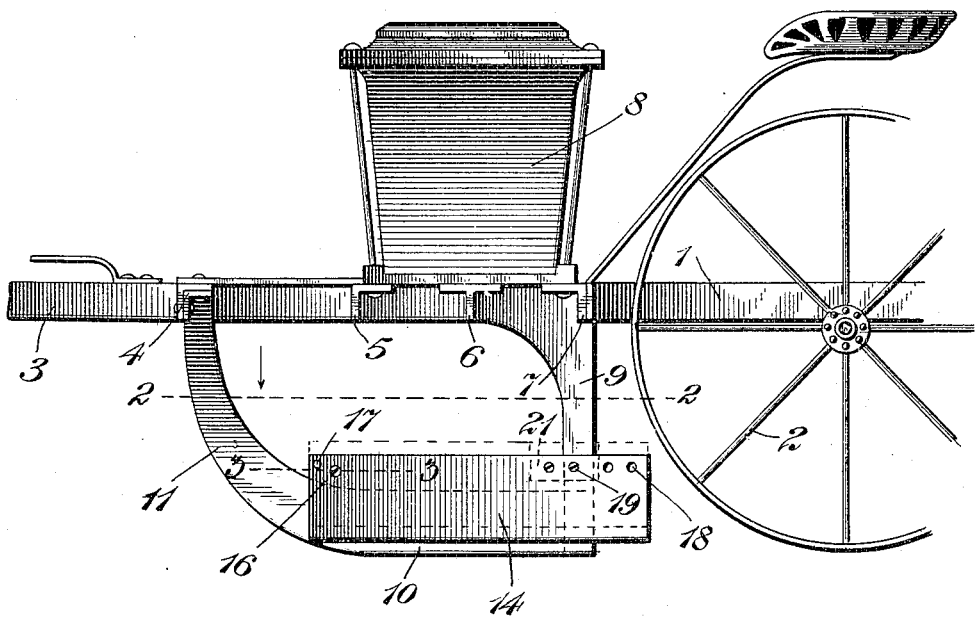
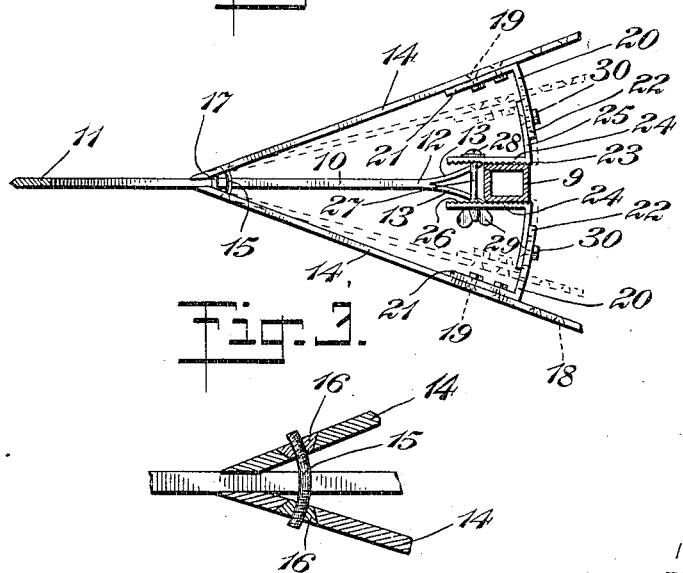
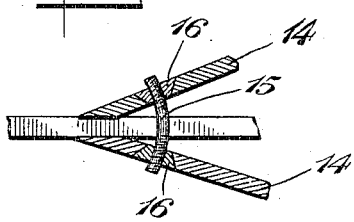
WITNESSES
INVENTOR
George Weidinger
BY
ATTORNEYS

UNITED STATES PATENT OFFICE.

GEORGE WEIDINGER, OF CIRCLEVILLE, OHIO.

PLANTER ATTACHMENT.

No. 838,366.　　　Specification of Letters Patent.　　　Patented Dec. 11, 1906.

Application filed August 9, 1906. Serial No. 329,832.

*To all whom it may concern:*

Be it known that I, GEORGE WEIDINGER, a citizen of the United States, and a resident of Circleville, in the county of Pickaway and State of Ohio, have invented a new and Improved Planter Attachment, of which the following is a full, clear, and exact description.

This invention relates to planter attachments, and is particularly useful in connection with devices of this character adapted to the sowing of corn and the like, in which a runner is provided with lateral blades to run in the furrow.

The object of the invention is to provide a planter attachment which is simple, strong, and durable in construction and in which the lateral blades are adjustable horizontally and vertically.

A further object of the invention is to provide a device of this character in which the blades are attached to the runner and to the seed-depositing tube, so that there are no external projections on the runner to prevent the scouring clean of the same by contact with the earth.

The invention consists in the construction and combination of parts to be more fully described hereinafter and particularly set forth in the claims.

Reference is to be had to the accompanying drawings, forming a part of this specification, in which similar characters of reference indicate corresponding parts in all the figures, and in which—

Figure 1 is a side elevation of a portion of a planter, showing my invention attached to the same. Fig. 2 is a horizontal section on the line 2 2 of Fig. 1, and Fig. 3 is a horizontal section of a portion of the device on the line 3 3 of Fig. 1.

Before proceeding to a more detailed description of my invention it should be understood that the same is applicable to nearly all forms of planters now in use in which a shoe or runner is secured to the framework and has an earth-engaging forward end upwardly disposed and adapted to slide along in the furrow as the planter is drawn along the ground. The lateral blades which are mounted at each side of the runner are adjustable both vertically and horizontally, and this is of importance in order that the depth at which the seed is to be planted and the depth to which it is to be covered with earth may be regulated. In many devices of this kind in use at present the operator is greatly inconvenienced by the accumulation of dirt upon the runner, which does not scour clean by contact with the earth. To obviate this inconvenience, my device is so arranged that all projections on the outer sides of the runner are avoided.

Referring more particularly to the drawings, 1 represents the frame of a corn or other planter of the usual type, mounted on wheels 2 and having a pole 3, to which draft-animals may be attached. Members 4, 5, 6, and 7 extend crosswise of the frame and are rigidly attached to the same. Upon the members is located the conventional hopper 8, which carries the seed and in which are located means (not shown) for permitting the regular depositing of the seed through a seed-tube 9, projecting downwardly from the hopper and communicating therewith. The runner or furrow-opener 10, which is located under the lateral extension of the framework, has its forward end 11 curved upwardly and securely mounted on the laterally-projecting member 4. The rear end 12 of the runner is bifurcated, as shown most clearly in Fig. 2, and each of the arms 13, formed by the bifurcation, extends on one side of the seed-depositing tube 9, which is located at the end 12 of the runner.

The tube 9 may be of any common form, but I preferably employ a tube of substantially rectangular cross-section having flat lateral faces, as shown most clearly in Fig. 2 and for a purpose which will appear hereinafter. The bifurcated end of the runner forms a depression in the bottom of the furrow into which the seeds from the hopper drop and which is covered by the earth which falls from the sides of the furrow into the depression after the planter has passed.

The lateral blades 14 are mounted at each side of the runner and are fastened together at their forward ends by means of a curved bolt-pin 15, having its ends threaded in opposite directions. The curvature of the pin is such that each end is substantially normal with the surface of a blade. A nut 16 is adapted to be screwed upon each end of the pin and fits into a suitable opening in each blade, as shown most clearly in Fig. 3. The nuts are tapered, and the openings are correspondingly beveled, so that the nuts may fit into these openings with their outer faces flush with the outer sides of the blades. The nuts are round and may have slots by means of which they may be turned with a screwdriver. It will be understood that by means of the bolt-pin 15 and the nut 16 the forward ends of the blades may be securely joined and clamped upon the runner to prevent the displacement of the blades from the latter. A stud 17, mounted in a suitable opening in one of the blades 14, extends across to the other blade and is adapted to engage the inner face of the second blade more firmly to secure the blades one to the other.

Near their rear extremities the blades are provided with a plurality of perforations 18. Mounted upon the inner sides of the blades by means of bolts 19 with countersunk heads are brackets 20, having arms 21 abutting against the inner faces of the blades and arms 22 extending inwardly toward the seed-depositing tube. The bolts 19 pass through suitable openings in the arms 21 of the brackets, which register with the perforations 18 in the blades. By having a plurality of said openings in the blades the brackets may be located in a number of positions, as circumstances require. A clamp comprising angles 23 with arms 24 abutting against the lateral faces of the tube 9 and arms 25 extending toward the arms 22 of the brackets is adjustably mounted upon the seed-tube. The arms 24 have corrugated inner faces 26, which engage the lateral faces of the tube 9 to prevent the slipping of the clamp. A pin 27, having a head 28 and a threaded end, passes through suitable openings in the arms 24 of the angles 23 and by means of a thumb-screw 29 is adapted to force the arms 24 together to rigidly attach the clamp to the tube 9. The laterally-extending arms of the brackets and of the clamp have perforations adapted to register, through which bolts 30 may be passed rigidly to secure these arms together. It should be understood that by means of the plurality of openings in these arms the blades may be adjusted laterally, as indicated in dotted lines in Fig. 2. Furthermore, the blades may be adjusted in a vertical direction by loosening the clamp and sliding the same up or down upon the tube until the proper height has been reached, when the clamp may be tightened to secure the blades at that height.

Having thus described my invention, I claim as new and desire to secure by Letters Patent—

1. In a planter attachment, the combination of a runner, lateral blades secured on each side of said runner, and brackets upon said blades projecting inwardly, with a seed-depositing tube between said blades, a clamp adjustably mounted upon said tube and having arms extending toward said brackets, and means for adjustably connecting said clamp and said brackets.

2. A planter attachment, comprising a runner, lateral blades secured at the forward ends on each side of said runner, a seed-depositing tube between said blades, a clamp upon said tube having lateral arms, brackets upon said blades having inwardly-disposed arms extending toward said clamp-arms, and means for adjustably connecting said arms.

3. A planter attachment, comprising a runner, blades adjustably connected at their forward ends on each side of said runner, brackets adjustably mounted on the inner sides of said blades and having arms extending inwardly, a seed-depositing tube between said blades, a clamp mounted upon said tube and adjustable in a vertical direction, said clamp having arms adapted to engage with the arms of said brackets, and means for adjustably connecting said arms.

4. In a planter attachment, a runner, blades adjustably connected at their forward ends on each side of said runner, brackets adjustably mounted upon the inner faces of said blades and having arms extending inwardly, said runner having a bifurcated end, a seed-depositing tube discharging at said bifurcated end, angles having corrugated arms against the lateral faces of said seed-depositing tube, means for clamping said arms against said tube, said angles having arms disposed toward said brackets, and means for adjustably connecting said brackets and said angles.

5. A planter attachment, comprising a runner, lateral blades secured on each side of said runner, a pin having threaded ends located in openings in each of said blades, said pin being curved so that an end is substantially normal with the face of each of said blades, nuts adapted to be screwed upon said threaded ends whereby said blades are forced toward each other, and means for adjustably mounting the rearward ends of said blades upon a seed-depositing tube located therebetween.

In testimony whereof I have signed my name to this specification in the presence of two subscribing witnesses.

GEORGE WEIDINGER.

Witnesses:
    FESTUS WALTERS,
    BARTON WALTERS.